US005810603A

United States Patent [19]

Kato et al.

[11] Patent Number: 5,810,603

[45] Date of Patent: Sep. 22, 1998

[54] KARAOKE NETWORK SYSTEM WITH BROADCASTING OF BACKGROUND PICTURES

[75] Inventors: Hirokazu Kato; Minoru Ogita; Youji Semba, all of Hamamatsu, Japan

[73] Assignee: Yamaha Corporation, Hamamatsu, Japan

[21] Appl. No.: 294,382

[22] Filed: Aug. 23, 1994

[30] Foreign Application Priority Data

Aug. 26, 1993 [JP] Japan .................................... 5-234050

[51] Int. Cl.[6] .............................. A63H 1/28; G09B 5/08; G10H 1/26

[52] U.S. Cl. .................. 434/307 A; 434/118; 95/200.49; 348/7; 455/4.2; 84/609; 370/432

[58] Field of Search ................................ 434/307 R–309, 434/318, 118, 365; 84/477 R, 609–613, 634–637, 644, 650–652, 662; 369/1, 2, 4, 48, 178, 192; 360/32, 72.2; 348/473, 595, 723, 563, 564, 484, 7, 12–14, 478, 488, 571; 358/335, 342; 379/93; 370/95.1, 95.2, 85.8, 432, 535; 340/825.03; 485/4.2, 5.1, 6.3; 395/250, 200.49; 704/769

[56] References Cited

U.S. PATENT DOCUMENTS

| | | | |
|---|---|---|---|
| 3,859,596 | 1/1975 | Jannery et al. | 455/5.1 |
| 4,168,532 | 9/1979 | Dempsey et al. | 395/250 X |
| 4,882,730 | 11/1989 | Shinmyo | 370/95.2 |
| 4,958,381 | 9/1990 | Toyoshima | 370/95.2 X |
| 5,014,125 | 5/1991 | Pocock et al. | 348/484 X |
| 5,018,021 | 5/1991 | Slater | 455/4.2 X |
| 5,046,066 | 9/1991 | Messenger | 370/95.2 X |
| 5,153,917 | 10/1992 | Kato | 434/307 A |
| 5,247,126 | 9/1993 | Okamura et al. | 434/307 A |
| 5,250,747 | 10/1993 | Tsumura | 434/307 A |
| 5,335,073 | 8/1994 | Yamamoto | 434/307 A |
| 5,613,192 | 3/1997 | Ikami et al. | 455/4.2 |
| 5,619,425 | 4/1997 | Funahashi et al. | 395/200.49 |
| 5,654,516 | 8/1997 | Tashiro et al. | 84/601 |
| 5,689,081 | 11/1997 | Tsurumi | 434/307 A X |
| 5,691,494 | 11/1997 | Sai et al. | 84/609 |

FOREIGN PATENT DOCUMENTS

| | | |
|---|---|---|
| 0140593 | 5/1985 | European Pat. Off. . |
| 5165483 | 7/1993 | Japan . |

OTHER PUBLICATIONS

European Search Report, dated Nov. 11, 1994, Appl. No. GB 9417214.5.

*Primary Examiner*—Joe Cheng
*Attorney, Agent, or Firm*—Pillsbury Madison & Sutro LLP

[57] ABSTRACT

A karaoke network system includes a central station for serving karaoke data and image data, and a group of karaoke terminals connected to the central station through a communication line having a common channel and a plurality of parallel channels for locally presenting a karaoke accompaniment and a background picture. The central station includes a first server responsive to a request command from karaoke terminal for transmitting to the common channel requested karaoke data individually addressed to the karaoke terminal, and a second server operative independently of the first server for transmitting to the parallel channels a plurality of different image data continuously broadcast to each karaoke terminal. The karaoke terminal includes an admitter for admitting the karaoke data addressed thereto from the common channel, and a selector for selecting one of the parallel channels to admit therefrom image data associated to the admitted karaoke data, such that the karaoke terminal can present the karaoke accompaniment and the background picture according to the simultaneously admitted karaoke data and the image data.

18 Claims, 3 Drawing Sheets

| | | | | | |
|---|---|---|---|---|---|
| Header | Address information | Designation information | Accompaniment and lyric information | Check bit code | Tailer |

KARAOKE NETWORK SYSTEM WITH BROADCASTING OF BACKGROUND PICTURES

BACKGROUND OF THE INVENTION

The present invention relates to a karaoke network system comprised of a common central station and a group of local karaoke terminals connected to the central station through a network line such as a Local Area Network (LAN) for locally presenting a karaoke accompaniment and an associated background picture.

A karaoke apparatus is constructed to produce a karaoke accompaniment, which is mixed with a vocal performance of a singer. The typical karaoke apparatus is a stand-alone and self-support type which can present a display of lyric characters and dynamic background pictures in addition to the karaoke accompaniment. For example, a Laser Karaoke is equipped with a great number of Laser Discs which record a mixture of an audio signal representing a karaoke accompaniment together with lyric data, and a background video signal for each of the entry songs. The Laser Karaoke is provided with a disk changer for selecting one of the Laser Discs upon receiving a song request, and a specific disk player for reproducing a requested karaoke play from the selected Laser Disk.

On the other hand, a musical synthesizer type of conventional karaoke apparatus is equipped with a tone generator which receives accompaniment information contained in karaoke data to synthesize a karaoke accompaniment. Such a type of karaoke apparatus can store karaoke data and background image data separately from each other such that one set of background image data can be shared by different karaoke entry songs. By this, the number of record disks storing the background image data can be reduced to simplify the overall construction of the karaoke apparatus.

In an advanced form, a group of synthesizer-type karaoke apparatuses are connected to a central station through a digital telephone line to construct a karaoke network system. Each local terminal of the karaoke apparatus requests the central station to transmit back requested digital karaoke data through the telephone line. The karaoke apparatus is basically free of a built-in record medium for storing karaoke data of the entry songs. However, each karaoke terminal still requires separate record disks for storing analog image data of the background pictures, and a disk player for driving the record disks. Consequently, conventional karaoke apparatus requires rather heavy equipment which hinder simplification and cost reduction.

SUMMARY OF THE INVENTION

In view of the above-noted drawbacks of the prior art, an object of the present invention is to simplify the construction of the karaoke terminal without degradation of the service quality in the karaoke network system. Another object of the present invention is to simplify the construction of the central station without restriction of availability of the background pictures in the karaoke network system.

According to the invention, the karaoke network system comprises a central station for serving karaoke data and image data, and a group of karaoke terminals connected to the central station through a communication line such as LAN having a common channel and a plurality of parallel channels for locally presenting a karaoke accompaniment and a background picture. The central station comprises first server means responsive to a request command from a karaoke terminal for transmitting to the common channel requested karaoke data individually addressed to the karaoke terminal, and second server means operative independently from the first server means for transmitting to the parallel channels a plurality of different image data continuously broadcast to each karaoke terminal. The karaoke terminal includes admitter means for admitting karaoke data addressed thereto from the common channel, and selector means for selecting one of the parallel channels to admit therefrom image data associated to the admitted karaoke data, such that the karaoke terminal can present the karaoke accompaniment and the background picture according to the simultaneously admitted karaoke data and image data.

In a practical form, the first server means has mailing means for transmitting karaoke data in a packet form containing address information detectable by the karaoke terminal which has issued the request command. On the other hand, the second server means has multiplexing means operative in a frequency division manner for transmitting the plurality of image data by means of carriers having different frequencies assigned to the respective parallel channels. In such a case, the first server means transmits the karaoke data containing designation information effective to designate a parallel channel which broadcasts the associated image data. Consequently, the selector means of the karaoke terminal can select the designated parallel channel according to the transmitted designation information.

According to the invention, a karaoke terminal apparatus is connectable to a central station through a communication line such as a LAN having a plurality of channels for admitting therefrom karaoke data and image data so as to present a karaoke accompaniment and a background picture. The karaoke terminal apparatus comprises commander means, admitter means, selector means, tone generator means and graphic processor means. The commander means transmits to the communication line a request command effective to request the central station to transmit back corresponding karaoke data through one channel of the communication line. The admitter means admits from said one channel the corresponding karaoke data which contains at least accompaniment information and designation information effective to designate another channel of the communication line, which is assigned with image data associated to the requested karaoke data. The selector means selects said another channel according to the designation information to admit therefrom the associated image data. The tone generator means processes the accompaniment information to synthesize a karaoke accompaniment. The graphic processor means processes the associated image data to reproduce a background picture simultaneously with the karaoke accompaniment.

In a practical form, the commander means sends out the request command by means of an individual carrier having a specific frequency assigned by the central station. The admitter means detects or decodes address information contained in a packet form of the admitted karaoke data so as to check correspondency of the admitted karaoke data. The selector means accesses said another channel to retrieve therefrom image data in the form of a video signal which is carried by a carrier having a specific frequency designated by the central station. The graphic means includes character generator means for processing lyric information contained in the karaoke data to generate lyric characters which are displayed in superposed relation to the background picture.

In operation of the inventive karaoke network system, the karaoke terminal transmits a request command to the central station which is connected to the karaoke terminal through a LAN. The central station transmits back corresponding karaoke data to the requesting karaoke terminal. Separately from the karaoke data, the central station continuously broadcasts a plurality of image data through a plurality of parallel channels to each karaoke terminal. Accordingly, the karaoke terminal synthesizes a karaoke accompaniment based on accompaniment information such as Musical Instrument Digital Interface (MIDI) data contained in the karaoke data, and displays lyric characters based on lyric information such as text data contained in the karaoke data. Further, the karaoke terminal selects one of the set of broadcast image data based on designation information so as to reproduce a background picture of a dynamic image in synchronization with the karaoke accompaniment.

In detail, the central station transmits the karaoke data through the single common channel, in digital packet form containing the accompaniment information, the lyric information, the designation information, the address information and other information. The karaoke terminal selectively receives the packet form of the karaoke data individually addressed thereto from the common channel according to the address information. Such packet switch communication is efficient for the transfer of the digital karaoke data which has a relatively small volume. Further, the central station broadcasts the plurality of different image data such as different video signals through the parallel channels by means of carriers having different frequencies. The karaoke terminal selectively retrieves the associated video signal specified by the designation information, from one of the parallel channels. Such a frequency division technology is suitable for the transfer of the plural video signals which have a relatively large data volume.

DETAILED DESCRIPTION OF THE INVENTION

Figure 1:
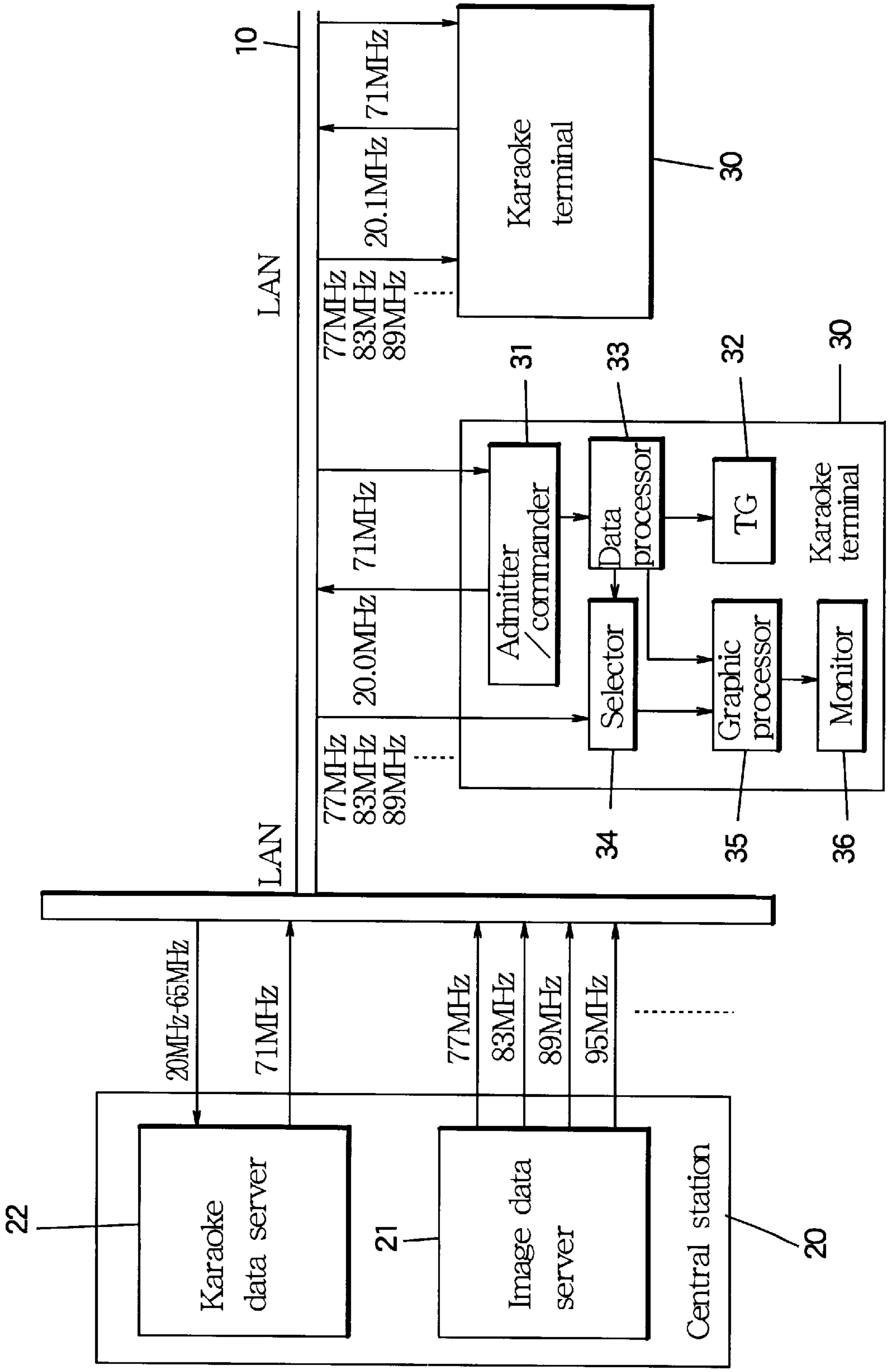
FIG. 1 is an overall block diagram showing one embodiment of the inventive karaoke network system.

Hereinafter, a preferred embodiment of the invention will be described in conjunction with the attached drawings. Referring to FIG. 1, the inventive karaoke network system is built on a communication line such as LAN 10 which utilizes a broadband transmission medium such as a coaxial cable or an optical fiber cable. A central station 20 and a group of local karaoke terminals 30 are connected to each other through the LAN 10 to constitute the karaoke network system. The LAN 10 has a plurality of channels divided into a single common channel and multiple parallel channels. The central station 20 functions as a karaoke server, while each karaoke terminal is located at a desired spot to locally present a karaoke accompaniment and an associated background picture, which are served by the central station in response to a request command from each karaoke terminal. The karaoke network system can be expanded by addition of a new karaoke terminal.

The central station 20 includes an image data server 21 and a karaoke data server 22. The image data server 21 operates independently from the karaoke data server 22 for transmitting to the parallel channels a plurality of different image data such as different analog video signals which are continuously and simultaneously broadcast to all of the karaoke terminals 30 in an endless manner by a one-way communication mode. On the other hand, the karaoke data server 22 responds to a request command from each karaoke terminal 30 for transmitting back to the common channel karaoke data which corresponds to a requested entry song and which is individually addressed to the requesting karaoke terminal 30. The karaoke data contains accompaniment information, lyric information, address information, designation information and other information.

Each karaoke terminal 30 is comprised of an admitter/commander 31, a tone generator (TG) 32, a data processor 33, a channel selector 34, a graphic processor 35 and a monitor 36 such as a CRT. The admitter/commander 31 functions as a two-way communication interface for transmitting a request command to the LAN 10, and for admitting or receiving the responding karaoke data from the LAN 10. The data processor 33 processes and decodes the admitted karaoke data to distribute the accompaniment information, the lyric information and the designation information to various parts of the karaoke terminal. Namely, the tone generator 32 receives the accompaniment information to synthesize a karaoke accompaniment of the requested song. The channel selector 34 receives the designation information to select one of the parallel channels to admit therefrom the image data associated to the karaoke data. The graphic processor 35 concurrently processes the admitted image data and the distributed lyric information to form dynamic background pictures and lyric characters, which are displayed by the monitor 36 in a superposed relation to each other.

As mentioned before, the LAN 10 has a plurality of channels which may be provided according to frequency division technology. One channel (common channel) functions as a karaoke data channel for transmitting the karaoke data from the karaoke data server 22 of the central station 20 to the requesting karaoke terminal 30. Other channels (parallel channels) function as image data channels for concurrently transmitting different items of image data from the image data server 21 of the central station 20 to the respective karaoke terminals 30 in a broadcast manner. In addition, the LAN 10 has a separate request command channel for transmitting a request command to the central station 20 from each karaoke terminal 30.

In the present embodiment, a single common channel is utilized to transfer the karaoke data which may have a relatively small digital information volume. A plurality of parallel channels are utilized to concurrently and continuously transfer the different items of image data which may have a relatively large information volume. For example, the LAN 10 is set up by a private communication line such as Community Antenna Television System (CATV) which has a broadband up to 1 GHz. In such a case, the plurality of channels are set according to frequency division as follows:

1. The request command channel

Each karaoke terminal is assigned an individual subchannel which has a specific frequency. For example, a frequency band ranging from 20 MHz to 65 MHz is divided into 450 subchannels with a pitch of 0.1 MHz so that at most 450 individual karaoke terminals 30 can be connected to and discriminated by the central station.

2. The karaoke data channel

A single common channel of 71 MHz is assigned to the karaoke data channel, which is 6 MHz higher than the upper limit (65 MHz) of the frequency band of the request command channel. Digital packet switching is adopted to address karaoke data to the requesting karaoke terminal 30.

3. Image data channels

A frequency band ranging from 77 MHz to 1 GHz is divided with a pitch of 6 MHz to provide about 150 number parallel channels such that at most 150 items of image data can be served concurrently in broadcast manner.

Figure 2:
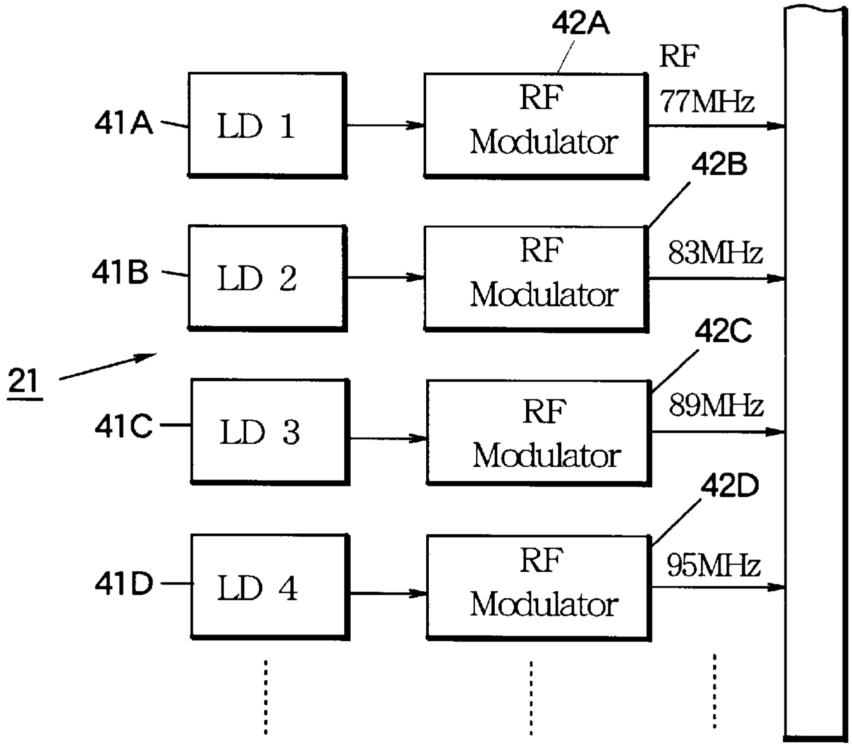
FIG. 2 is a detailed block diagram showing an image data server included in a central station of the inventive karaoke network system.

Hereinafter, detailed description is given for the various components of the karaoke network system in conjunction with FIGS. 2–5. Referring to FIG. 2, the image data server 21 includes a plurality of Laser Disc (LD) players 41A, 41B, 41C, 41D, . . . , and multiplexing means in the form of a plurality of corresponding radio frequency (RF) modulators 42A, 42B, 42C, 42D, . . . Each LD player reproduces analog image data in the form of a video signal, while the corresponding RF modulator modulates the video signal to transmit the same by means of carriers having a different frequency selected from 77 MHz, 83 MHz, 89 MHz, 95 MHz, . . . , which are assigned to the respective RF Modulators. These carrier frequencies correspond to CH4, CH5, . . . , of CATV. The LD players 41A, 41B, 41C, 41D, . . . , repeatedly access respective ones of LD1, LD2, LD3, LD4, . . . , which have recorded different items of dynamic background pictures. For example, LD1 has recorded a background picture which fits to Japanese ballads of summer season, LD2 has recorded a background picture which fits to Japanese ballads of winter season, LD3 has recorded records a background picture which fits to pops of summer season, and LD4 has recorded a background picture which fits to pops of winter season. In such a manner, the central station 20 continuously broadcasts the different items of the background pictures through the plurality of the image data channels, CH4, CH5, the individual karaoke terminal 30 simply selects one image data channel to present a desired dynamic background picture to match with the performed karaoke accompaniment of the requested song.

In the present embodiment, the central station 20 utilizes Laser Discs (LDs) for the image data source 21. Alternatively, the central station may utilize Video Compact Discs (Video-CDs) which have recorded dynamic pictures in the form of digital image data in contrast to LDs which have recorded dynamic pictures in the form of analog image data. In such a case, the central station 20 broadcasts different items of the digital image data through the plurality of the image data channels by means of carriers having different frequencies.

Figure 3:
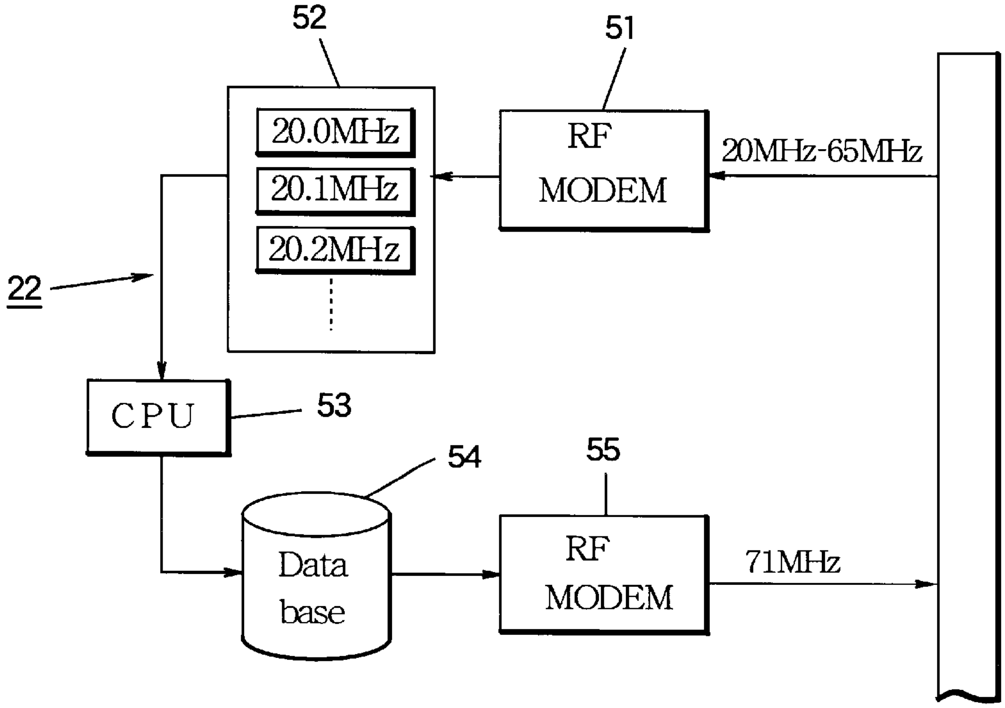
FIG. 3 is a detailed block diagram showing a karaoke data server included in the central station of the inventive karaoke network system.

Referring next to FIG. 3, the karaoke data server 22 includes an RF modem 51 for demodulating a modulated request command transmitted from the individual karaoke terminal 30 to thereby identify the requesting karaoke terminal 30 in terms of the carrier frequency assigned to the respective karaoke terminal 30. A memory 52 is connected to the RF modem 51 to store the content of the request command for each of the karaoke terminals 30. A CPU 53 scans the memory 52 by polling or otherwise to read out the stored content indicative of a requested entry song. Upon detection of the request command, the CPU 53 further accesses an entry song database 54 to retrieve therefrom karaoke data corresponding to the requested song. Moreover, the CPU 53 arranges the retrieved karaoke data in a digital packet form to which is added address information indicative of the requesting karaoke terminal 30. An RF modem 55 modulates the packet form of the karaoke data, and mails the same by means of the 71 MHz carrier to the common channel.

Figures 4, 5:
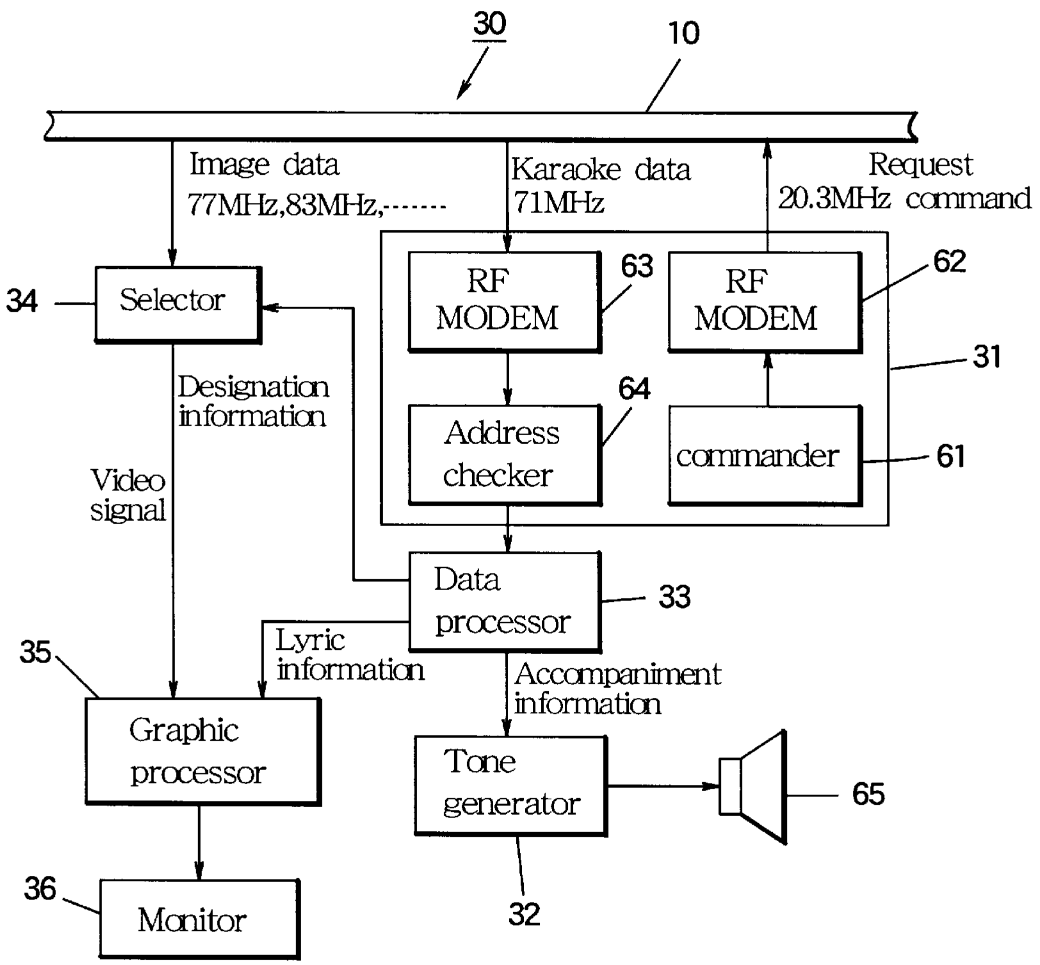
FIG. 4 is a schematic diagram showing a packet form of karaoke data transferred in the inventive karaoke network system.
FIG. 5 is a detailed block diagram showing a karaoke terminal involved in the inventive karaoke network system.

Referring to FIG. 4, the packet form of the karaoke data contains a serial train of address information, designation information, accompaniment and lyric information and a check bit code, the serial train being lead by a header and being ended by a tailer. The designation information is provisionally determined in matching with the accompaniment and lyric information. In the present embodiment, the designation information designates a single one of the image data channels, CH4, CH5 broadcasts a background picture associated to a requested song in one-to-one correspondence. Alternatively, the designation information may designate several image data channels, CH4, CH5 broadcast background pictures grouped into a particular genre associated to a requested song. Such a digital packet is transmitted at a high rate on the order of, for example, 5–10 mbps.

Referring last to FIG. 5, the karaoke terminal 30 includes a karaoke request commander 61 for issuing a request command in response to an input entry number of a desired karaoke song. An RF modem 62 modulates this request command and transmits the same to the LAN 10 by means of a specific carrier frequency, e.g., 20.3 MHz which is specifically assigned to the individual karaoke terminal 30. When the central station 20 transmits back karaoke data by means of the 71 MHz carrier in response to every request command received by the central station 20, an RF modem 63 provided in the requesting karaoke terminal 30 picks up a packet of the karaoke data from the 71 MHz channel and demodulates the same to detect therefrom the associated address information. A subsequent address checker 64 checks to see if the address information corresponds to the address of the requesting karaoke terminal 30. If the check result is affirmative, the karaoke data is admitted by the requesting karaoke terminal 30, and is passed to a subsequent data processor 33. If the address information does not correspond to the address of the requesting karaoke terminal 30, the karaoke data is rejected. Accordingly, the commander 61, RF modems 62, 63 and address checker 64 constitute an admitter/commander 31. More specifically, the RF modem 63 and the address checker 64 constitute a karaoke data admitter for decoding the address information.

The data processor 33 processes the admitted karaoke data to selectively transfer the associated accompaniment information to a tone generator 32. The tone generator 32 processes the accompaniment information to synthesize a karaoke accompaniment, which is acoustically emitted by a loudspeaker 65. The data processor 33 concurrently processes the associated lyric information. A processed form thereof represents a sequence of lyric characters corresponding to the karaoke accompaniment, and is transferred to a graphic processor 35. In detail, the data processor 33 contains a font ROM, a video RAM and a video controller for generating the lyric characters. The font ROM is searched according to the lyric information to retrieve therefrom dot patterns of lyric characters, which are written into the video RAM. The written lyric characters are input into the graphic processor 35.

Further, the data processor 33 passes the designation information to a selector 34 in the form of an RF demodulator for accessing the designated image data. Accordingly the RF demodulator selectively demodulates particular image data broadcast through the designated channel, one of CH4, CH5. The demodulated image data is fed to the graphic processor 35 in the form of a video signal representative of a dynamic background picture. The graphic processor 35 superposes the background picture and the lyric characters on each other, which are displayed on a CRT monitor 36. In such an operation, the admitted karaoke data contains the designation information which designates one of the image data channels, CH4, CH5, for example selecting therefrom a background picture matching the mood of the karaoke song. Alternatively, the designation information may designate several image data channels, CH4, CH5 grouped into one genre associated with a requested song. In such a case, the selector 34 selects one of the several image data channels, one of CH4, CH5, for example. Further, when the same genre is designated in a next time, the selector 34 is operated to select another of the several image data channels, another one of CH4, CH5 to thereby prevent duplicative presentation of the same background picture. For this purpose, a sequence table is provided in the data processor 33 to sequentially specify different ones of the several image data channels, CH4, CH5, whenever the same genre is designated by the designation information. Such a sequence table may be provided in the central station 20 rather than each terminal 30. Consequently, the karaoke terminal 30 can present a background picture on the monitor display 36, thereby eliminating a built-in video player. Further, since the central station 20 continuously broadcasts the background pictures, the karaoke terminal 30 does not need to wait for preparation of the image reproduction as would otherwise be the case. Additionally, a microphone (not shown) may be connected to the loudspeaker 65 for mixing a physical vocal performance with the karaoke instrumental accompaniment.

As described above, in the inventive karaoke network system, the karaoke terminal 30 does not require an image data source such as a Laser Disc or a Video-CD to thereby simplify the terminal structure. Nonetheless, the central station 20 serves the image data so that the karaoke terminal 30 can present the dynamic background picture which is indispensable for the karaoke performance stage. Further, the karaoke terminal 30 does not store any karaoke data which is needed for the karaoke performance. Instead, the central station 20 serves the karaoke data at a fast speed in response to a request from individual karaoke terminals 30. Therefore, even if a vast number of karaoke terminals 30 are connected to the central station 20, there is 110 substantial delay in start of the performance in the respective karaoke terminals 30. According to the inventive system, the central station 20 continuously activates the plurality of image data channels, CH4, CH5, while the karaoke terminal 30 selects one of the image data channels, one of CH4, CH5. In contrast to another system where a selected one of the image data entries is individually served in response to a request from each karaoke terminal, the inventive system does not require any video disk changer in the central station to thereby simplify the construction thereof. Further, the image data is continuously broadcast, hence the karaoke terminal 30 instantly displays the background picture on the monitor 36 by the channel selection. Moreover, in the case that two or more Karaoke terminals 30 issue a request of the same song at different times, the central station 20 can access a common disk for serving the same background picture to these karaoke terminals 30.

What is claimed is:

1. A karaoke network system comprising a central station for serving karaoke data and image data, and a group of karaoke terminals connected to the central station through a communication line having a common channel and a plurality of parallel channels for locally presenting a karaoke accompaniment and a background picture, wherein:

the central station includes first server means responsive to a request command from one of said group of karaoke terminals for transmitting to the common channel requested karaoke data individually addressed to said one of said group of karaoke terminals, and second server means operative independently of the first server means for transmitting to said plurality of parallel channels a plurality of different image data continuously broadcast to each karaoke terminal of said group of karaoke terminals; and said one of said group of the karaoke terminals includes admitter means for admitting karaoke data addressed thereto from the common channel, and selector means for selecting one of the parallel channels of said plurality of parallel channels to admit therefrom image data associated with said admitted karaoke data, such that said one of said group of karaoke terminals presents said karaoke accompaniment and said background picture according to said simultaneously admitted karaoke data and said image data.

2. The karaoke network system of claim 1, wherein the first server means includes mailing means for transmitting the requested karaoke data in a packet form containing address information detectable by said one of said group of karaoke terminals issuing said request command.

3. The karaoke network system of claim 1, wherein the second server means includes multiplexing means for transmitting said plurality of different image data by means of carriers having different frequencies assigned to respective parallel channels.

4. The karaoke network system of claim 1, wherein the first server means includes means for transmitting the requested karaoke data together with designation information designating a parallel channel broadcasting associated image data so that the selector means can select the designated parallel channel according to the transmitted designation information.

5. A karaoke terminal apparatus connectable to a central station through a communication line having a plurality of channels for admitting therefrom karaoke data and image data so as to present a karaoke accompaniment and a background picture, the karaoke terminal apparatus comprising:

commander means for transmitting to the communication line a request command requesting the central station to transmit back corresponding karaoke data through a first channel of the communication line;

admitter means for admitting from said first channel the corresponding karaoke data containing at least accompaniment information and for admitting from said first channel designation information designating a second channel of the communication line, said second channel assigned image data associated with corresponding karaoke data;

selector means for selecting said second channel according to the designation information to admit therefrom said associated image data;

tone generator means for processing the accompaniment information to synthesize said karaoke accompaniment; and graphic data processor means for processing said associated image data to reproduce said background picture simultaneously with the karaoke accompaniment.

6. The karaoke terminal apparatus of claim 5, wherein the commander means includes means for transmitting the request command by means of a carrier having a specific frequency assigned by the central station.

7. The karaoke terminal apparatus of claim 5, wherein the admitter means includes means for decoding address information contained in a packet form from the admitted karaoke data so as to check correspondency of the admitted karaoke data.

8. The karaoke terminal apparatus of claim 5, wherein the selector means includes means for accessing said second channel to retrieve therefrom said associated image data in the form of a video signal carried by a carrier having a specific frequency designated by the central station.

9. The karaoke terminal apparatus of claim 5, wherein the graphic data processor means includes character generator means for processing lyric information contained in the admitted karaoke data to generate lyric characters displayed in superposed relation to the background picture.

10. The karaoke terminal apparatus of claim 5, including a data processor selectively transferring the accompaniment information to said tone generator means.

11. The karaoke terminal apparatus of claim 10, wherein the commander means includes a transmitter transmitting the request command on a carrier having a specific frequency assigned by the central station.

12. The karaoke terminal apparatus of claim 10, wherein the admitter means includes an address checker decoding address information contained in a packet form from the admitted karaoke data so as to check correspondency of the admitted karaoke data.

13. The karaoke terminal apparatus of claim 10, wherein said data processor passes said designation information to the selector means so as to access said second channel to retrieve therefrom said associated image data in the form of a video signal carried by a carrier having a specific frequency designated by the central station.

14. The karaoke terminal apparatus of claim 10, wherein the graphic data processor means processes lyric information contained in the admitted karaoke data to generate lyric characters selectively transferred to a graphic processor and displayed in superposed relation to the background picture.

15. A karaoke network system comprising a central station for serving karaoke data and image data, and a group of karaoke terminals connected to the central station through a communication line having a common channel and a plurality of parallel channels for locally presenting a karaoke accompaniment and a background picture, wherein:

the central station includes a karaoke data server responsive to a request command from one of said group of karaoke terminals, said karaoke data server transmitting to the common channel requested karaoke data individually addressed to said one of said group of karaoke terminals, and an image data server operative independently of the karaoke data server, said image data server transmitting to said plurality of parallel channels a plurality of different image data continuously and substantially simultaneously broadcast to each karaoke terminal of said group of karaoke terminals; and said one of said group of karaoke terminals includes an admitter admitting karaoke data addressed to said one of said group of the karaoke terminals from the common channel, and a selector selecting one of the parallel channels of said plurality of parallel channels to admit from said one of the parallel channels of said plurality of parallel channels said image data associated with said admitted karaoke data, such that said one of said group of karaoke terminals presents said karaoke accompaniment and said background picture according to said simultaneously admitted karaoke data and said image data.

16. The karaoke network system of claim 15, wherein the karaoke server includes a mailer transmitting the requested karaoke data in a packet form containing address information detectable by said one of said group of karaoke terminals issuing said request command.

17. The karaoke network system of claim 15, wherein the image data server includes a multiplexer transmitting said plurality of different image data on carriers having different frequencies assigned to respective parallel channels.

18. The karaoke network system of claim 15, wherein the karaoke data server includes a transmitter transmitting the requested karaoke data together with designation information designating a parallel channel broadcasting associated image data so that the selector can select the designated parallel channel according to the transmitted designation information.

* * * * *